April 19, 1932. C. W. BURGER 1,854,608
INDICATOR APPARATUS
Filed Sept. 23, 1927   2 Sheets-Sheet 2
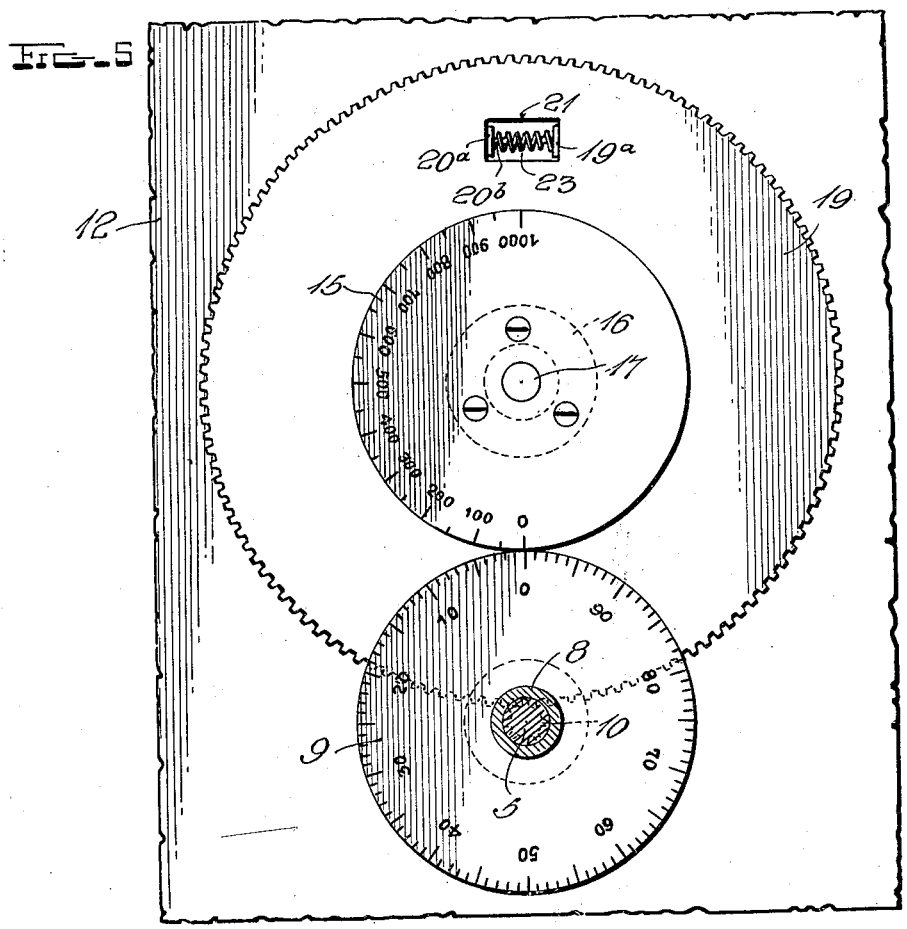
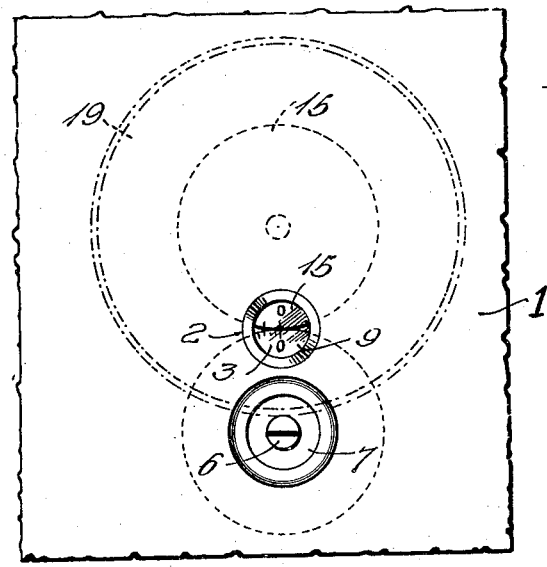
INVENTOR.
Clarence W. Burger,
BY John B. Brody
ATTORNEY.

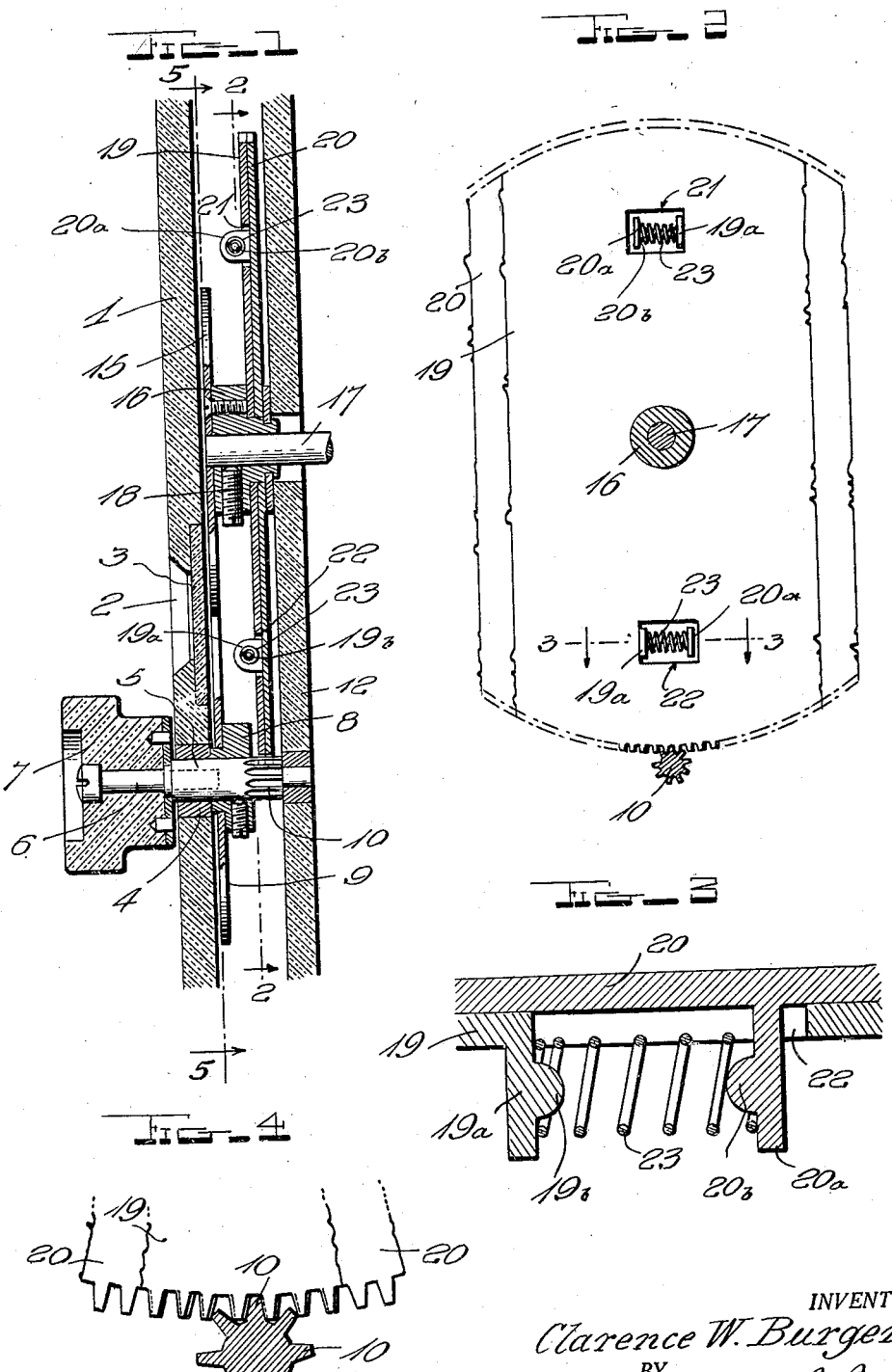

Patented Apr. 19, 1932

1,854,608

UNITED STATES PATENT OFFICE

CLARENCE W. BURGER, OF CHERRYDALE, VIRGINIA, ASSIGNOR TO NATIONAL ELECTRICAL SUPPLY COMPANY, OF WASHINGTON, DISTRICT OF COLUMBIA, A CORPORATION OF VIRGINIA

INDICATOR APPARATUS

Application filed September 23, 1927. Serial No. 221,563.

My invention relates broadly to indicator apparatus and more particularly to a construction and arrangement of gears for adjusting an electrical tuning apparatus in a signal receiving system with a high degree of precision.

One of the objects of my invention is to provide an instrument adjusting structure for indicating the position of tuning apparatus for selective settings, wherein a system of gears is provided with means for preventing lost motion between the gears.

Another object of my invention is to provide a construction of precision gears having means for preventing slippage between the gears under conditions of wear of the gears for the accurate setting of electrical tuning apparatus to a particular position.

Still another object of my invention is to provide an arrangement of gears in a dial adjusting structure, wherein portions of the gearing are normally maintained under torsional stresses intermeshing the gears in such manner as to avoid lost motion between the gears and enabling tuning apparatus to be set with a high degree of precision to a particular position for the reception of desired signaling energy.

A further object of my invention is to provide an arrangement of rotatable calibrated dials for adjusting the angular position of an instrument shaft wherein the dials are aligned edge to edge in the same plane and have different rates of revolution for effecting micrometer adjustment of the apparatus controlled by the instrument shaft.

A still further object of my invention resides in the construction and arrangement of the parts of the gearing system in an indicator apparatus for a dial adjusting structure, as will be more fully understood in the specification hereinafter following by reference to the accompanying drawings in which:

Figure 1 is a cross-sectional view taken through the dial adjusting structure of my invention; Fig. 2 is a cross-sectional view taken through the dial adjusting structure on line 2—2 of Fig. 1; Fig. 3 is an enlarged cross-sectional view of a fragmentary portion of the main gear in the dial adjusting structure of my invention on line 3—3 of Fig. 2; Fig. 4 is a fragmentary view showing the arrangement of pinion and main gear which I provide for securing precision adjustment of the tuning apparatus while eliminating lost motion; Fig. 5 is a front elevation of the dial system employed in the instrument adjusting structure of my invention taken on line 5—5 of Fig. 1; and Fig. 6 is a front elevation of the panel structure through which the dials which are connected to the gearing system are visible.

My invention is particularly directed to a control system for the tuning apparatus in a radio receiver where an indicator is actuated synchronously with the movement of the tuning apparatus. I provide a system of gearing having a high degree of precision. This is accomplished by constructing the main gear from two parallel plate members having correspondingly cut teeth at the peripheries thereof for engaging the teeth of a pinion which is manually controlled for adjusting the main gear and tuning apparatus. The two plate members constituting the main gear are maintained under a constant torsional stress so that the separate parts may be displaced with respect to each other under conditions of wear or under conditions of off-center movement for uniformly imparting motion to the tuning apparatus independent of any irregularities which would otherwise be introduced. The parts of the main gear cooperate with each other in effecting a uniform driving of the tuning apparatus from an external control device.

Referring to the drawings in more detail reference character 1 designates the panel structure of a signaling apparatus apertured at 2 for securing a window 3 in position through which the rotatable dials 9 and 15 may be viewed. A bushing 4 is provided at the panel 1 and serves as a bearing for the pinion shaft 5, to which is attached by means of screw device 6 the operating knob 7. A bushing 8 is secured to the shaft 5 and carries the indicator dial 9 in a position in which the calibrations on the peripheral edge thereof may be viewed through the window 3. The member 5 is provided with pinion teeth 10 cut adjacent the end thereof. A bushing 11 is provided in panel 12 providing a bearing for the pinion gear 10, as shown at 14. The tuning apparatus is carried by shaft 17. This shaft extends through apertured panel 12 and carries a bushing 16, which is set in position thereon by means of screw member 18. Bushing 16 carries the indicator dial 15 calibrated at its periphery, the calibrations being visible through the window 3. It will be observed that dial 9 is calibrated throughout its periphery or through an angle of 360 degrees through which shaft 5 is rotatable, whereas dial 15 is calibrated only through an angular distance of 180 degrees at its periphery. That is, shaft 5 is rotatable through a multiplicity of revolutions, while shaft 17 is revolvable through 180 degrees. The ratio of gearing is such that the dials 9 and 15 move at different peripheral speeds. The calibrations on the dials are aligned and observed through the aperture 2 in the panel 1. The main gear comprises plate members 19 and 20 each having teeth cut at the periphery for engaging the teeth of panel 10. The plate member 19 is slotted at 21 and 22. Lugs 19a extend from the plate member 19 substantially at right angles thereto and are each provided with a semi-spherical knob 19b at one side thereof. The plate member 20 is provided with lugs 20a projecting therefrom and extending through the slots 21 and 22, as shown in Figs. 1, 2 and 3. The lug 20a is provided with a semi-spherical knob portion 20b directed toward the correspondingly shaped knob portion 19b. Expansion coil spring devices 23 are compressed between the knobs 19b and 20b and tend to exert a torsional pressure between the parts 19 and 20 of the main gear. Any tendency of slippage between the teeth of pinion gear 10 and the teeth formed on the plates 19 and 20 is therefore eliminated, for a continuous interlock is provided between the main gear and the pinion gear. Slippage and lost motion due to wearing of the teeth of the pinion gear and the teeth of the main gear is avoided in the present control system by the twisting action to which the pinion 10 is subjected under the influence of spring devices 23. For this reason a high degree of precision is obtainable with the adjustment of the tuning apparatus under control of knob 7.

The control and indicator system of my invention has been found to be extremely practical in construction and successful in operation, and while I have described a preferred embodiment of my invention I desire that it be understood that modifications may be made and that no limitations upon my invention are intended other than are imposed by the scope of the appended claims.

What I claim as new and desire to secure by Letters Patent of the United States is as follows:

1. Indicator apparatus comprising a rotatable instrument shaft, a rotatable adjusting shaft, a dial carried by each of said shafts and aligned in the same plane edge to edge, a pinion carried by said rotatable adjusting shaft, and a main gear carried by said instrument shaft in mesh with said pinion for imparting rotative movement to said instrument shaft and revolving said dials in opposite directions at different angular speeds.

2. Indicator apparatus comprising a rotatable instrument shaft, a rotatable control shaft, dials carried by each of said shafts and aligned edge to edge in the same plane, a pinion carried by said rotatable control shaft, a gear carried by said instrument shaft adjacent the dial thereon and meshing with said pinion whereby rotative movement of said pinion operates to impart movement to said main gear for revolving said dials in opposite directions in a predetermined ratio of angular movement one with respect to the other.

3. Indicator apparatus comprising a multiple panel structure, a rotatable instrument shaft projectable through one panel structure to a position in the rear of another panel structure, a dial carried by said instrument shaft, a rotatable control shaft journaled in said panel structure and carrying a dial and a pinion thereon, said dial being aligned in a plane with the plane of the dial on said instrument shaft in a position edge to edge, and a main gear carried by said instrument shaft and meshing with the pinion on said control shaft whereby rotation of said control shaft revolves said dials in opposite directions in the rear of one of said panel structures at different angular speeds.

4. An indicator apparatus comprising a pair of panels located in parallel spaced relationship, an instrument shaft projecting through one of said panels and terminating in the rear of the other of said panels, an indicator dial and main drive gear secured to said instrument shaft, a rotatable adjusting shaft projecting through the other of said panels and carrying an indicator dial thereon arranged to be aligned edge to edge with the indicator dial carried by said instrument shaft, said indicator dials being calibrated adjacent the peripheral edges thereof, the calibrations on the indicator dial on said instrument shaft extending through substantially 180 degrees, while the calibrations on the indicator dial on said rotatable adjusting shaft extend over substantially 360 degrees, a pinion carried by said rotatable adjusting shaft and meshing with said main gear, whereby said indicator dials are revolved in opposite directions upon rotation of said rotatable adjusting shaft for indicating the position of the instrument shaft by the alignment of the calibrations on said dials as observed through an aperture in one of said panels adjacent said indicator dials.

5. Indicator apparatus comprising a pair of panels located in parallel spaced relationship, an instrument shaft projecting through one of said panels and terminating in a position in the rear of the other of said panels, an indicator dial and main gear carried by said instrument shaft, a rotatable adjusting shaft journaled in said panel and carrying a rotatable dial in a plane aligned edge to edge with the rotatable dial on said instrument shaft, and a pinion carried by said last mentioned shaft in mesh with said main gear, said indicator dials being calibrated adjacent the peripheral edges thereof, the calibrations on the indicator dial on said instrument shaft extending through substantially 180 degrees, while the calibrations on the indicator dial on said rotatable adjusting shaft extend over substantially 360 degrees.

6. Indicator apparatus comprising a panel structure, a rotatable instrument shaft, a rotatable adjusting shaft, indicator dials disposed in the same plane edge to edge and carried by each of said shafts and rotatable in opposite directions at different angular speeds under movement of said rotatable adjusting shaft, a pinion carried by said rotatable adjusting shaft and a main gear carried by said instrument shaft in mesh with said pinion, said indicator dials being calibrated adjacent the peripheral edges thereof, the calibrations on the indicator dial on said instrument shaft extending through substantially 180 degrees, while the calibrations on the indicator dial on said rotatable adjusting shaft extend over substantially 360 degrees.

7. Indicator apparatus comprising a panel structure, a rotatable instrument shaft, a rotatable adjusting shaft, indicator dials disposed in the same plane edge to edge and carried by each of said shafts and rotatable in opposite directions under movement of said rotatable adjusting shaft at different angular velocities, a pinion carried by said rotatable adjusting shaft and a main gear carried by said instrument shaft in mesh with said pinion, said indicator dials being calibrated adjacent the peripheral edges thereof, the calibrations on the indicator dial on said instrument shaft extending through substantially 180 degrees, while the calibrations on the indicator dial on said rotatable adjusting shaft extend over substantially 360 degrees.

In testimony whereof I affix my signature.

CLARENCE W. BURGER.